US006951398B2

United States Patent
Borra et al.

(10) Patent No.: US 6,951,398 B2
(45) Date of Patent: Oct. 4, 2005

(54) DEFORMABLE REFLECTING MIRRORS FROM METALLIC SURFACE LAYERS DEPOSITED ON LIQUIDS

(75) Inventors: Ermanno Borra, Québec (CA); Anna Ritcey, Cap-Rouge (CA); Hélene Yockel-Lelièvre, Québec (CA)

(73) Assignee: Université Laval, Québec (CA)

( * ) Notice: Subject to any disclaimer, the term of this patent is extended or adjusted under 35 U.S.C. 154(b) by 101 days.

(21) Appl. No.: 10/409,311

(22) Filed: Apr. 9, 2003

(65) Prior Publication Data

US 2003/0227695 A1 Dec. 11, 2003

Related U.S. Application Data

(60) Provisional application No. 60/371,089, filed on Apr. 10, 2002.

(51) Int. Cl.[7] .................................................. G02B 5/08
(52) U.S. Cl. .................... 359/846; 359/291; 359/296; 359/900; 423/600; 423/604; 264/1.9; 264/2.1; 264/298
(58) Field of Search ................................ 359/900, 846, 359/848, 291, 296; 264/1.9, 2.1, 298; 423/593, 600, 604; 502/330, 332, 347, 348, 355; 427/456, 125, 126.5

(56) References Cited

U.S. PATENT DOCUMENTS

| | | | | |
|---|---|---|---|---|
| 669,119 A | * | 3/1901 | Krank | 264/298 |
| 3,010,153 A | * | 11/1961 | Bittner | 264/219 |
| 5,650,880 A | * | 7/1997 | Shuter et al. | 359/846 |
| 6,249,271 B1 | * | 6/2001 | Albert et al. | 345/107 |
| 6,323,989 B1 | * | 11/2001 | Jacobson et al. | 359/296 |
| 6,538,801 B2 | * | 3/2003 | Jacobson et al. | 359/296 |
| 6,721,083 B2 | * | 4/2004 | Jacobson et al. | 359/296 |
| 2004/0008430 A1 | * | 1/2004 | Borra et al. | 359/843 |

FOREIGN PATENT DOCUMENTS

EP  1361585  * 11/2003

OTHER PUBLICATIONS

E.F. Borra, A.M. Ritcey, E. Artigau, "Floating Mirrors", Astrophysical Journal Letters, 1999, p. 516, L115 to L118.

Borra E F. Ritcey A M: "Titable Liquid Mirror Telescopes" Proc Spie –Int. Soc. Opt. Eng. vol. 4003, Mar. 29, 2000, pp. 331–336, XP009015487 usa.

* cited by examiner

*Primary Examiner*—Ricky D. Shafer
(74) *Attorney, Agent, or Firm*—Ogilvy Renault, LLP

(57) ABSTRACT

The invention relates to a new type of reflective optical element made of a reflective metallic layer comprising reflecting nanoparticles deposited on a liquid surface. Metallic or non-metallic nanometer-sized particles are coated with a ligand. The coated particles are concentrated and deposited on the surface of a liquid where they self-assemble to give optical-quality high-reflectivity optical surfaces. Coating liquid surfaces with reflective layers allows one to make inexpensive and versatile high-quality mirrors. The surfaces of liquids can be shaped by a variety of techniques.

16 Claims, 2 Drawing Sheets

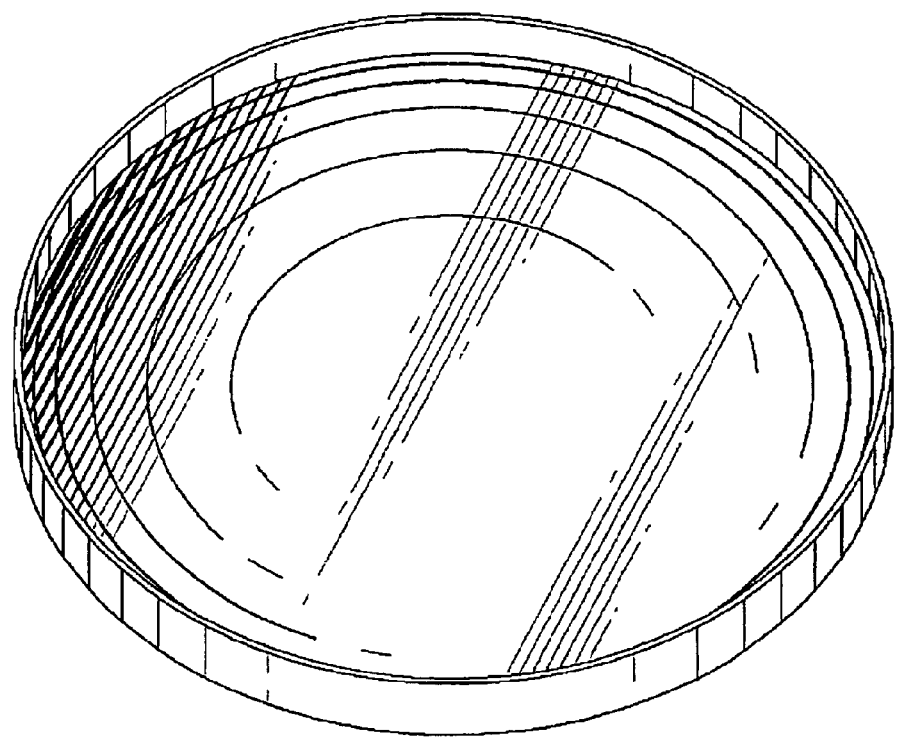
FIG_3
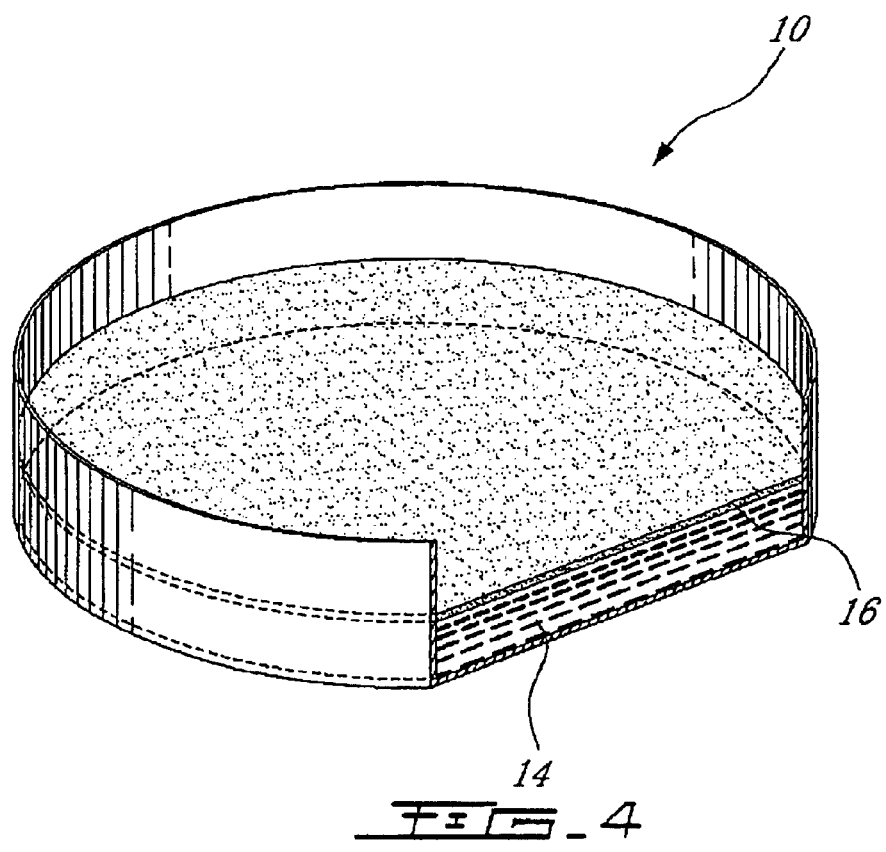
FIG_4

DEFORMABLE REFLECTING MIRRORS FROM METALLIC SURFACE LAYERS DEPOSITED ON LIQUIDS

BACKGROUND OF INVENTION (a) Field of the Invention

The present invention relates to deformable reflecting mirrors comprising metallic surface layers which are deposited on support liquids. More particularly, this invention relates to the construction of inexpensive liquid mirrors that are made of a liquid, such as water or an organic liquid, which is coated with a reflecting surface layer that is preferably metallic. The invention is particularly intended for making reflecting mirrors having controllable complex shapes that can be modified on short time notice. The reflecting mirrors according to the invention can replace far more expensive, and less versatile reflective mirrors that are currently in use and which rely on glass or metal substrates that support a reflective layer.

(b) Description of Prior Art

Optics is an enabling technology and optical elements are used in a large variety of technological applications. There are therefore a large number of possible applications for improved mirrors.

Liquid mirrors have previously been made using liquid metals such as mercury and gallium. These mirrors are monolithic and consist of a liquid metal poured over a solid container. On the other hand, liquid mirrors using colloidal particles have been proposed (E. F. Borra, A. M Ritcey, E. Artigau, 1999 "Floating mirrors" Astrophysical Journal Letters, 516, L115). The mirrors described by Borra et al., are based on a reflecting layer that is trapped at the interface between two liquids. In these mirrors, there is an air-liquid interface, a metal-liquid interface and another liquid-air interface as the light is reflected from the metallic layer back to the air. This is clearly a disadvantage.

SUMMARY OF THE INVENTION

It is an object of the present invention to provide a liquid mirror consisting of a metallic layer that is deposited on the top surface of a liquid.

It is another object of the present invention to provide liquid mirrors that are of better quality than presently known liquid mirrors.

It is another object of the present invention to provide liquid mirrors having only an air-metal interface so that the metallic surface is the first surface seen by the incoming light.

It is yet another object of the present invention to provide liquid mirrors wherein the surface of one mirror is divided into multiple micromirrors that can individually be shaped at will.

It is another object of the present invention to provide liquid mirrors that could be used as replacements for Micro Electro-Mechanical Systems (MEMS), which are used inter alia to redirect light in switches used in telecommunications.

It is another object of the present invention to provide deformable mirrors by coating liquids with a reflective metallic layer.

It is another object of the present invention to coat liquids with a reflective layer using a variety of techniques.

These and other objects of the present invention may be achieved by providing a process for malting a liquid reflective mirror, which comprises providing nanoparticles of a material capable of reflecting light, providing a ligand for the nanoparticles and coating them with the ligand, producing a concentrated suspension of the ligand coated nanoparticles, providing a container and adding thereto a liquid capable of supporting a reflective layer on a top surface thereof, spreading the concentrated suspension on the top surface of the liquid under conditions to form a layer of the nanoparticles over the liquid, and allowing the nanoparticles to become substantially free of extraneous liquid over their outer surface.

The invention also relates to a liquid mirror comprising a container, a supply of liquid in the container, the liquid being capable of allowing reflecting particles to float thereon, and a layer of reflecting particles covering a top surface of the liquid. The reflecting nanoparticles are coated with a ligand and are substantially free of extraneous liquid over their outer surface. The ligand coated nanoparticles are further in direct contact with air without any substantial liquid layer covering them.

BRIEF DESCRIPTION OF DRAWINGS

FIG. 3 shows a liquid mirror according to the invention; and

FIG. 4 is a perpective view, partly sectioned, of the liquid mirror shown in FIG. 3

DESCRIPTION OF PREFERRED EMBODIMENTS

Figure 1:
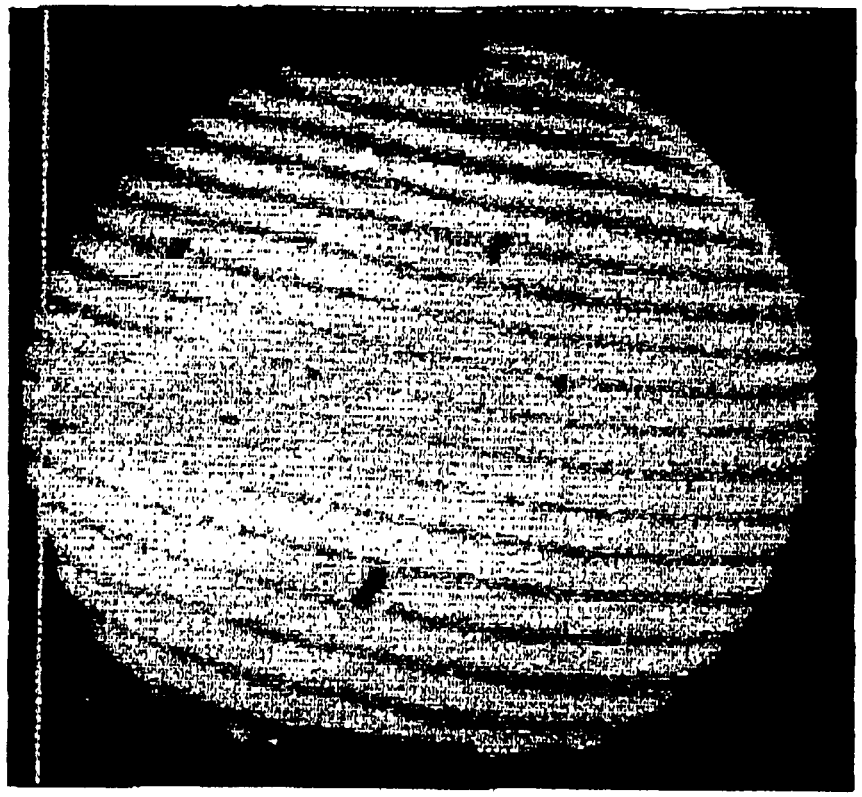
FIG. 1 is an illustration of the fringes obtained by subjecting a liquid mirror according to the invention to an interferometer test.

The nanoparticles preferably comprise a metal in nanoparticulate form that is capable of reflecting light, such as silver, gold, aluminum, and the like.

The process according to the invention preferably comprises providing an aqueous suspension of the nanoparticles, mixing the aqueous suspension with a solution of the ligand in a solvent, rincing the concentrated suspension with pure solvent to remove excess ligand, and after spreading the concentrated suspension over the liquid surface, allowing water or solvent to substantially evaporate, leaving coated particles substantially free of water or solvent.

Although any suitable ligands could be used, according to the invention, the ligand is preferably selected from the group consisting of 2,2-dipyridyl (DPD), 1,10-phenanthroline (PHT), 2,9-dimethyl-1,10-phenanthroline (DMP), and their copper complexes, $Cu(DPD)_2BF_4$, $Cu(PHT)_2BF_4$ and $Cu(DMP)_2BF_4$. Of course, any other ligands well known to those skilled in the art could be used.

The solvent that is used with the ligand is preferably a hydrophobic organic solvent, such as 1,2-dichloroethane, dichloromethane, chloroform, and the like.

The support liquid is preferably water or an organic liquid less dense than water, including oils, although any liquid could be used provided it can support the reflecting nanoparticles In case the support liquid is an organic liquid, an aqueous solution of a surfactant is added during the spreading operation to lower the surface tension of water, allowing it to coat the top surface of the organic liquid.

When it is desired to obtain a mirror with a particular shape, it is shaped to a predetermined surface outline, such as with an electrical field or a magnetic field.

When the support liquid consists of water, the container should preferably be hydrophobic, and when it consists of an organic liquid, the container has to be hydrophilic.

The metal film can be supported by a variety of liquids as mentioned above, each being optimized for a particular application as it is well known to those skilled in the art.

The preferred nanoparticles are silver particles, although any other suitable metallic particles can be used, such as gold, aluminum, or the like. The nanoparticles may even be non-metallic. Preferably, the formation of silver nanoparticles is carried out by chemical reduction in an aqueous medium. Of course nanoparticles of silver or other metals can be prepared with other techniques, such as ablation from a solid, and the like as is well known to those skilled in the art.

The preparation of the nanoparticles is preferably carried out as described in P. C. Lee and D. Meisel, J. Phys. Chem. 1982, 86, 3391.

As mentioned above, the process according to the invention includes coating the nanoparticles with a ligand to provide a stabilizing layer. This is carried out while spontaneously concentrating the nanoparticles at the interface between two liquid phases. Coating is normally carried by a modification of the method described by K. C. Gordon, J. J. McGarvey and K. P. Taylor, J. Phys. Chem., 1989, 93, 6814. More specifically, the aqueous suspension of nanoparticles of silver obtained as described above is shaken for example with an equal volume of a 1,2-dichloroethane solution of 1,10-phenanthroline. Other ligands could obviously be used for coating the nanoparticles, as well as other solvents as will be appreciated by those skilled in the art.

Obtaining a concentrated suspension of the coated nanoparticles is preferably carried out by a shaking process. To achieved this, a mechanical paint shaker that provides a vigorous and constant shaking for at least 5 minutes, may for example be used.

The step of concentrating the suspension is essential in the fabrication of a highly reflecting film at a liquid-air boundary, as opposed to a liquid-liquid interface. This step is important for the preparation of nanoparticles to be used as liquid mirrors according to the invention.

More preferably, the process according to the invention may be carried out as follows:
  a portion of the two phase system including the aqueous solution of nanoparticles and the ligand solution is poured into a separatory funnel;
  the denser organic phase is removed through the funnel stopcock;
  the upper aqueous phase is removed by aspiration;
  the remaining suspension of nanoparticles, preferably silver nanoparticles, is removed along with residual quantities of the aqueous and organic phases, and is stored in a polypropylene container. The nature of the container has some importance, since a hydrophilic container would destabilize the suspension;
  for higher reflectivity, it is recommended to wash off the excess of ligand remaining in the organic phase after the preparation; this can be done by rinsing the concentrated suspension a few times with pure 1,2-dichloroethane or other organic solvents;
  the above steps can be repeated, and several batches of the isolated suspension can be combined;
  a reflective surface is obtained by pouring the concentrated suspension onto water in a hydrophobic container. In such a container, the residual organic solvent, containing the suspended particles, completely surrounds the aqueous phase. Attempts to spread the suspension of particles on water in a hydrophilic container such as glass, lead to a concentration of the particles at the interface between the aqueous phase and the minority denser organic phase. These conditions are inverted in the case where the support liquid is an organic solvent less dense than water, oils for example;
  the minority denser organic phase is allowed to evaporate.
  In the case where the support liquid is an organic liquid less dense than water, the minority denser aqueous phase is allowed to evaporate.

According to the invention, and as mentioned above, it is possible to use any other metal from the periodic table of elements as long as they are capable of reflecting light, such as gold, aluminum, and the like.

The nanoparticles, could also be obtained by means that are not chemical, such as laser or mechanical ablation from a solid. It is also possible to use other ligands for coating the nanoparticles, as well as other solvents. Mirrors could also be formed with non-metallic particles.

The surface of the liquids can be shaped by a variety of techniques. Among the techniques that are preferred, undisturbed surfaces that give flat mirrors may be mentioned. Prototypes of flat surfaces using a metal coated liquid have been-prepared and several flat liquid mirrors have been extensively tested. Interferometric tests at a wavelength of 633 nm were carried out with an interferometer.

Figure 2:
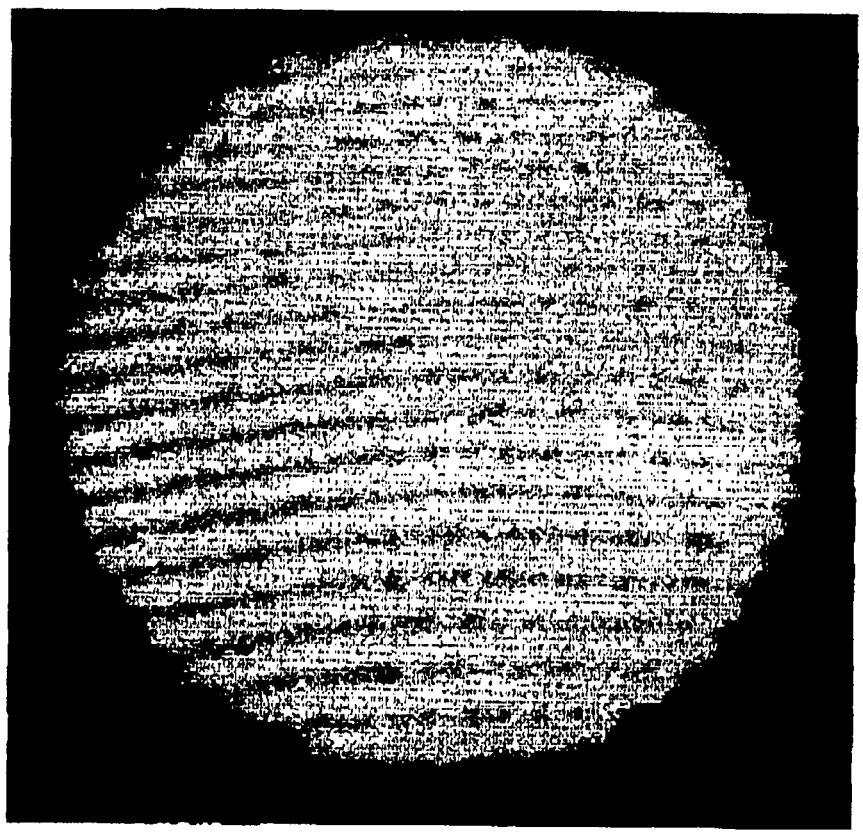
FIG. 2 is a similar illustration in the case of a glass mirror of good quality.

FIG. 1 shows the fringes obtained by measuring a 10 cm diameter sample of one of the flat surfaces testes. These fringes are comparable to those obtained, under the same conditions, for a glass mirror that has a surface that deviates by less than $\frac{1}{20}$ of a wavelength from a flat surface (FIG. 2). It can readily be seen that FIG. 1 and FIG. 2 are comparable so that it will be realized that a flat mirror obtained by the process according to the invention is of as good quality as a good glass mirror.

Rotation gives parabolic mirrors. FIG. 3 shows an embodiment of a rotating mirror that has a reflecting liquid made by the process according to the invention. FIG. 4 shows the mirror 10 of FIG. 3, partly cross-sectioned, wherein a liquid 14 has its top surface covered with a layer of reflective nanoparticles 16.

Liquid surfaces can also be shaped with electric fields and with magnetic fields. Changing the shapes of the fields changes the shapes of the surfaces. It is thus possible to create mirrors having arbitrary surfaces. The surfaces could shift shape in short period of time (less than one hundredth of a second). All those techniques can therefore be used to create liquid surfaces that have desirable shapes. The surfaces can then be coated with reflective metallic layers to create mirrors having the desired surfaces.

The mirrors according to the invention are susceptible of a number of applications, such as in the fields of telecommunication, projectors, aspheric surfaces in optical systems, microscopes, telescopes, lithographic machines, and the like.

It is understood that modifications are possible according to the invention, provided that they are within the scope of the appended claims.

What is claimed is:

1. Process for making a liquid reflective mirror, which comprises
  providing nanoparticles of a material capable of reflecting light, providing a ligand for said nanoparticles and coating said nanoparticles with said ligand, producing a concentrated suspension of the ligand coated nanoparticles, providing a container and adding thereto a liquid capable of supporting a reflective layer of the ligand coated nanoparticles on a top surface thereof, spreading said concentrated suspension on the top surface of said liquid under conditions to form said reflective layer of ligand coated nanoparticles over said liquid, and causing said reflective layer of ligand coated nanoparticles to become substantially free of extraneous liquid over their outer surface.

2. Process according to claim 1, wherein said nanoparticles comprises a metal in nanoparticulate form.

3. Process according to claim 2, wherein said metal is selected from the group consisting of silver, gold and aluminum.

4. Process according to claim 1, which comprises providing an aqueous suspension of said nanoparticles, mixing said aqueous suspension with a solution of said ligand in a solvent, rincing off excess ligand with pure solvent, and after spreading said concentrated suspension, allowing water or solvent to substantially evaporate, leaving coated particles substantially free of said water or solvent.

5. Process according to claim 4, wherein said ligand is selected from the group consisting of 2,2-dipyridyl (DPD), 1,10-phenanthroline (PHT), 2,9-dimethyl-1,10-phenanhroline 9DMP), and copper complexes thereof, $Cu(DPD)_2BF_4$, $Cu(PHT)_2BF_4$, and $Cu(BMP)_2BF_4$.

6. Process according to claim 4, wherein said solvent is a hydrophilic organic solvent.

7. Process according to claim 4, wherein said solvent is selected from the group consisting of 1,2-dichloroethane, dichloromethane and chloroform.

8. Process according to claim 1, wherein said liquid is selected from the group consisting of water and an organic liquid.

9. Process according to claim 8, wherein said liquid consists of an organic liquid.

10. Process according to claim 9, wherein said organic liquid comprises an oil.

11. Process according to claim 9, which comprises adding water and a surfactant while spreading the concentrated suspension on the top surface of the organic liquid so as to lower surface tension of the water.

12. Process according to claim 1, which comprises shaping said mirror to a predetermined surface outline.

13. Process according to claim 1, which comprises shaping said mirror with an electrical field or a magnetic field.

14. Process according to claim 8, wherein said liquid comprises water, said container being hydrophobic.

15. Process according to claim 8, wherein said liquid comprises an organic solvent or an oil, said container being hydrophilic.

16. Liquid mirror comprising a container, a supply of liquid in said container, said liquid capable of allowing reflective nanoparticles to float thereon, and a layer of reflective nanoparticles covering a top surface of said liquid, said reflective nanoparticles being coated with a ligand and being substantially free of extraneous liquid over their outer surface, said ligand reflective coated nanoparticles further being in direct contact with air without any substantial liquid layer covering said reflective nanoparticles.

* * * * *